US011513238B2

(12) United States Patent
Yamane

(10) Patent No.: US 11,513,238 B2
(45) Date of Patent: Nov. 29, 2022

(54) PARTICLE DETECTION DEVICE AND IMAGE GENERATION APPARATUS

(71) Applicant: Kioxia Corporation, Tokyo (JP)

(72) Inventor: Takeshi Yamane, Tsukuba Ibaraki (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/447,788

(22) Filed: Sep. 15, 2021

(65) Prior Publication Data

US 2022/0317317 A1 Oct. 6, 2022

(30) Foreign Application Priority Data

Mar. 31, 2021 (JP) .............................. JP2021-060979

(51) Int. Cl.
*G01T 1/16* (2006.01)
(52) U.S. Cl.
CPC .................................. *G01T 1/1606* (2013.01)
(58) Field of Classification Search
CPC ..................................................... G01T 1/1606
See application file for complete search history.

(56) References Cited

U.S. PATENT DOCUMENTS

| | | | | |
|---|---|---|---|---|
| 4,037,102 A | * | 7/1977 | Hoyle | H01L 39/10 250/336.1 |
| 5,028,786 A | * | 7/1991 | Da Silva | G01T 1/1606 250/336.2 |
| 2017/0330653 A1 | * | 11/2017 | Lee | F25B 9/002 |
| 2020/0033488 A1 | | 1/2020 | Yamane | |

FOREIGN PATENT DOCUMENTS

| | | |
|---|---|---|
| JP | JR 5419122 B2 | 2/2014 |
| JP | JR 2020-16543 A | 1/2020 |

OTHER PUBLICATIONS

A. Kushino, et al.,"Thermal Conductivity Measurements for Superconducting Mass Spectrometry" Netsu Bussei, vol. 21, No. 2, pp. 81-85 (2007).

* cited by examiner

*Primary Examiner* — David P Porta
*Assistant Examiner* — Gisselle M Gutierrez
(74) *Attorney, Agent, or Firm* — Finnegan, Henderson, Farabow, Garrett & Dunner, LLP

(57) ABSTRACT

A particle detection device of an embodiment includes: a detector including a plurality of superconducting strips, and detecting a particle generated from a particle generation source; a conversion mechanism including a plurality of channels provided for the respective superconducting strips, and converting an analog signal from a corresponding one of the superconducting strips into a digital signal; an aggregation mechanism including a circuit which receives an output from the conversion mechanism; a first temperature maintaining portion maintaining a first temperature equal to or lower than a superconducting transition temperature; a first low-temperature container housing the first temperature maintaining portion; and a vacuum container housing the conversion mechanism and the first low-temperature container, and including an opening, the detector being housed in the first low-temperature container, and being connected to the first temperature maintaining portion, and the conversion mechanism being maintained at a temperature not lower than the first temperature.

16 Claims, 13 Drawing Sheets

PARTICLE DETECTION DEVICE AND IMAGE GENERATION APPARATUS

CROSS REFERENCE TO RELATED APPLICATIONS

This application is based upon and claims the benefit of priority from the prior Japanese Patent Application No. 2021-060979, filed on Mar. 31, 2021, the entire contents of which are incorporated herein by reference.

FIELD

Embodiments of the present invention relate to particle detection devices and an image generation apparatus.

BACKGROUND

Particle detection devices using a superconducting single photon detector (SSPD) are known. Such a particle detection device generates a pulse signal when X-ray photons collide with one of the superconducting nanostrips constituting the SSPD. The particle detection device then detects the number of photons (the number of particles) by counting the number of pulses of the generated pulse signal.

However, an SSPD is maintained in a cryogenic container at or below the superconducting transition temperature. Therefore, in a case where a mechanism (a counter) for counting pulse signals is installed on a room temperature side, heat inflow from the room temperature into the container increases. Particularly, in a case where an SSPD is used in an image generation apparatus, it is necessary to set the number of superconducting nanostrips at 100 or larger.

DETAILED DESCRIPTION

The following is a description of embodiments of the present invention, with reference to the accompanying drawings. The drawings are schematic or conceptual, and the relationships between the thicknesses and the widths of the respective components, the proportions of the sizes of the components, and the like are not necessarily the same as the actual ones. Even in a case where the same components are shown, the dimensions and the proportions may be indicated differently from each other between the drawings.

First Embodiment

Figure 1:
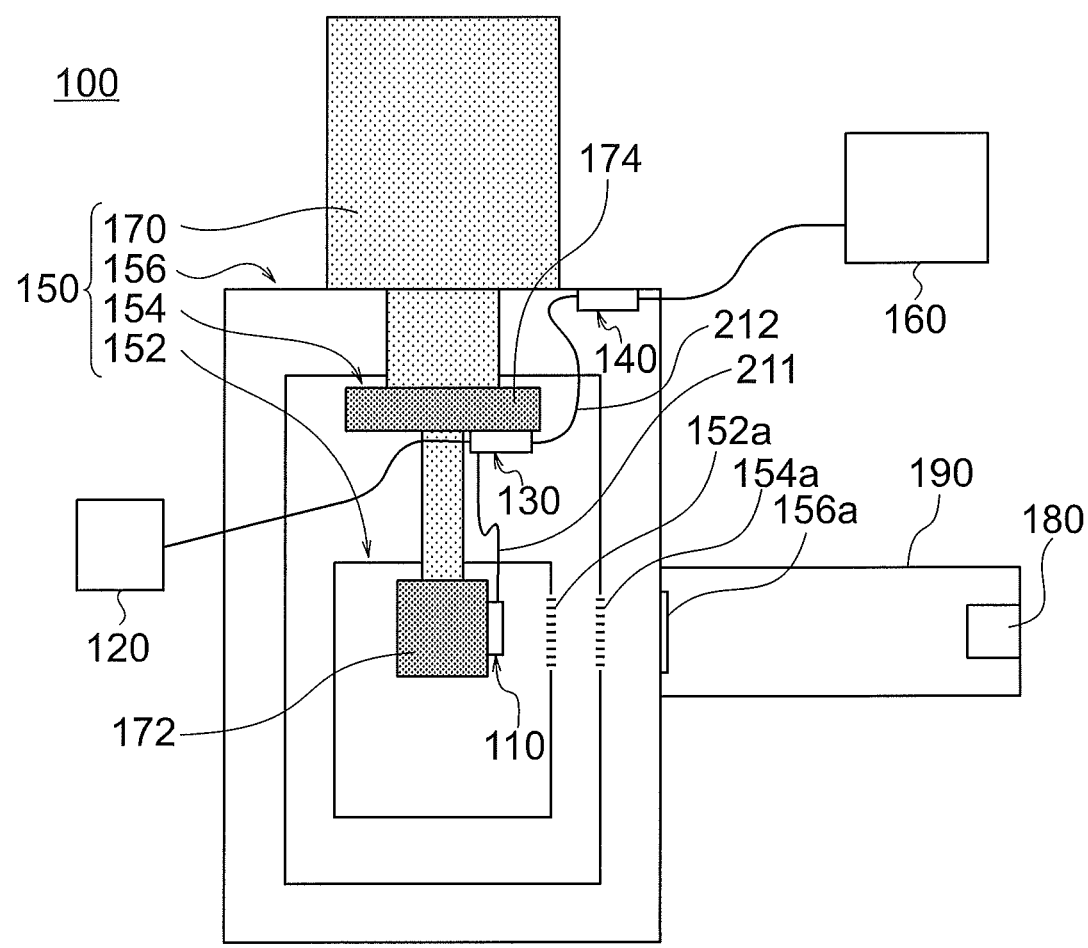
FIG. 1 is a cross-sectional diagram showing a particle detection device according to a first embodiment.

FIG. 1 shows the configuration of a particle detection device according to a first embodiment. A particle detection device 100 of the first embodiment includes a superconducting single photon detector (SSPD) 110, a constant-current power supply 120, a conversion mechanism 130, an aggregation mechanism 140, a cooling mechanism 150, and a computer 160.

The cooling mechanism 150 includes a first low-temperature container 152, a second low-temperature container 154 housing the first low-temperature container 152, a vacuum container 156 housing the second low-temperature container 154, and a refrigerator 170.

The refrigerator 170 includes a first temperature maintaining portion (first cooler) 172 and a second temperature maintaining portion (second cooler) 174, and performs two-stage freezing. The first temperature maintaining portion 172 is housed in the first low-temperature container 152. The second temperature maintaining portion 174 is housed in the second low-temperature container 154. The SSPD 110 is connected to the first temperature maintaining portion 172, and is maintained at a temperature $T_1$ that is equal to or lower than the superconducting transition temperature of the superconducting material forming the SSPD 110.

The conversion mechanism 130 is connected to the second temperature maintaining portion 174, and is maintained at a temperature $T_2$ equal to or higher than the temperature $T_1$. For example, in a case where the superconducting material is niobium, the temperature $T_1$ ranges from 20% of the superconducting transition temperature to the superconducting transition temperature (1.84 to 9.2 K), and is about 4 K, for example. The temperature $T_2$ is 100 K or lower, and is about 65 K, for example.

Windows 152a and 154a that pass the particles to be detected and block heat are formed in the first low-temperature container 152 and the second low-temperature container 154, respectively. In a case where the particles to be detected are hard X-ray photons, aluminum foil or the like is used for the windows. Likewise, the vacuum container 156 has an opening 156a. Further, a vacuum container 190 in which a particle generation source 180 is housed is connected to the vacuum container 156. The degree of vacuum in the vacuum container 156 is desirably $1.0 \times 10^{-6}$ mbar or lower.

Figure 2:
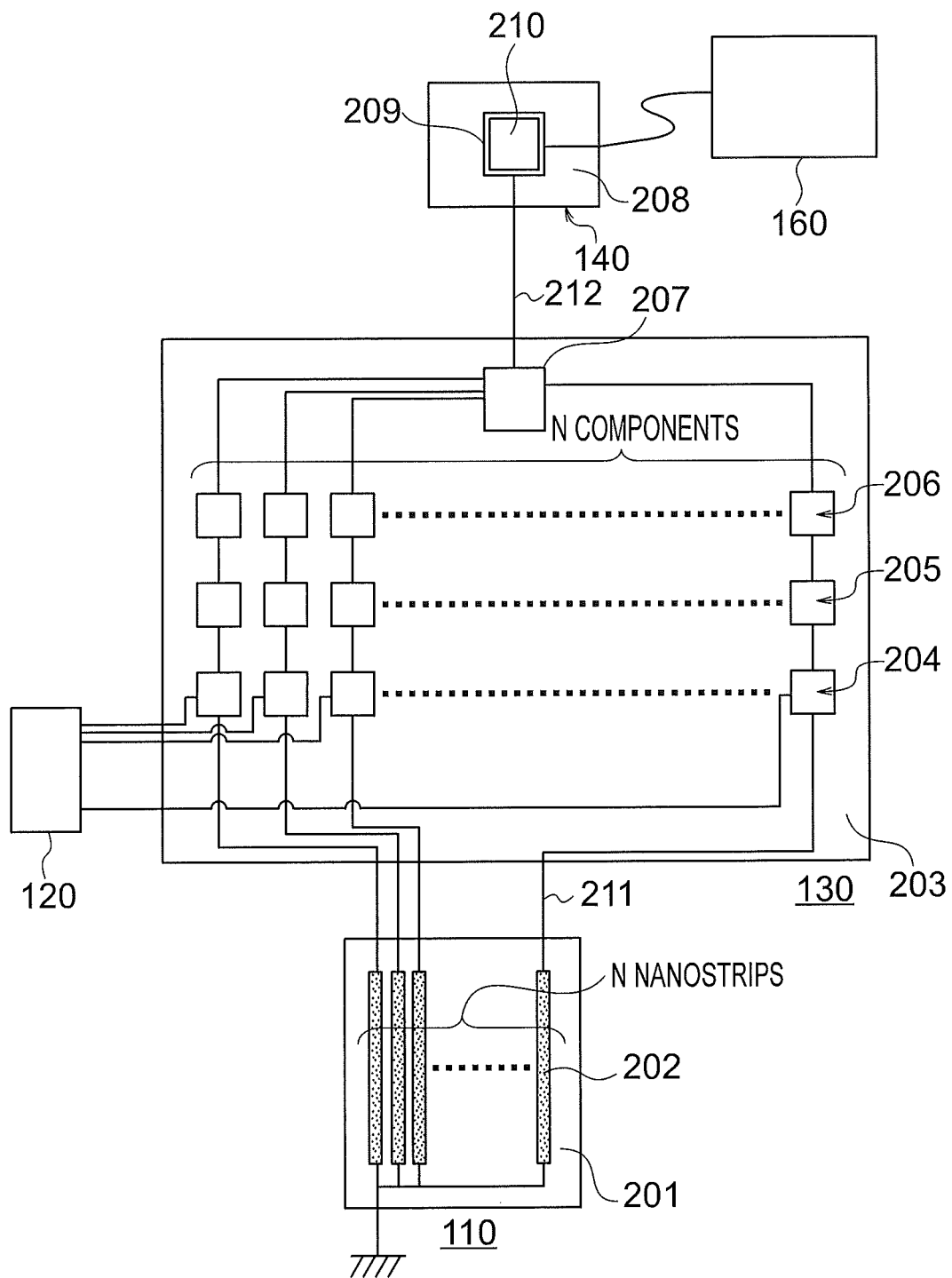
FIG. 2 is a circuit diagram showing the particle detection device according to the first embodiment.

As shown in FIG. 2, the SSPD 110 has N (N≥2) linear superconducting nanostrips 202 that are formed parallel to one another and at regular intervals on a substrate 201 such as a silicon wafer. Here, N is a natural number. For example, niobium is used as the superconducting material that forms the superconducting nanostrips 202.

As shown in FIG. 2, the conversion mechanism 130 includes bias tees 204, amplifiers 205, and comparators 206 provided for the N respective superconducting nanostrips 202. The bias tees 204, the amplifiers 205, and the comparators 206 are disposed on a printed board 203, for example. The conversion mechanism 130 also includes a counter 207 that is disposed on the printed board 203, has N channels provided for the N superconducting nanostrips 202, and is connected to the N comparators 206.

Each of the superconducting nanostrips 202 has one end grounded and the other end connected to the RF and DC terminals of the corresponding bias tee 204. The DC terminals of the bias tees 204 are connected to the constant-current power supply 120. The RF terminal of each bias tee 204 is connected to the input terminal of the corresponding amplifier 205. The output terminal of each amplifier 205 is connected to the input terminal of the corresponding comparator 206. The output terminal of each comparator 206 is connected to the input terminal of the counter 207.

The aggregation mechanism 140 includes a collection/distribution circuit 209 disposed on a printed board 208, for example. The collection/distribution circuit 209 receives an output signal from the counter 207 at its input terminal. The output terminal of the collection/distribution circuit 209 is connected to the computer 160. Note that the counter 207 and the collection/distribution circuit 209 are semiconductor circuits, and are formed with field programmable gate arrays (FPGA), application specific integrated circuits (ASIC), or the like. The aggregation mechanism 140 is housed in a region that is outside the second low-temperature container 154 and inside the vacuum container 156. In this case, the collection/distribution circuit 209 is cooled by a Peltier element 210, for example.

Operating Principles of the Particle Detection Device

Figure 3:
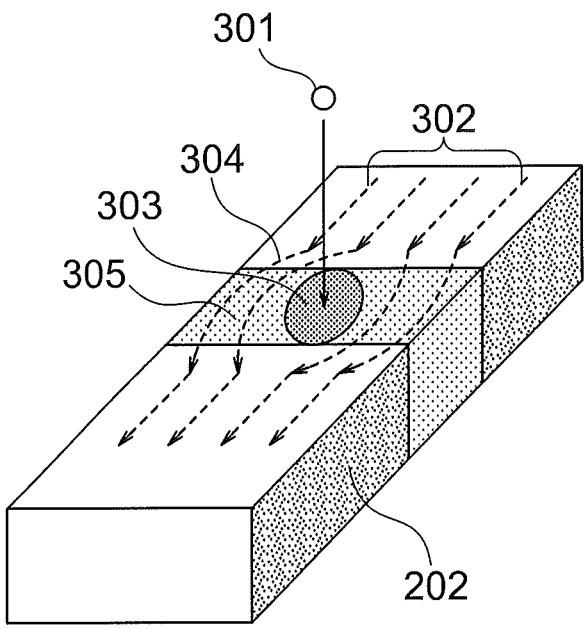
FIG. 3 is a perspective diagram for explaining the operating principles of the particle detection device.

Next, the operating principles of the particle detection device 100 are described with reference to FIGS. 3 and 4. As shown in FIG. 3, a particle 301 such as an X-ray photon generated from the particle generation source 180 collides with one superconducting nanostrip 202. In the superconducting nanostrip 202, an electric current that does not exceed the superconducting critical current is applied beforehand from the constant-current power supply 120 via the bias tee 204, and flows as indicated by arrows 302. Each bias tee 204 functions as a device for applying a direct current without affecting a high-frequency signal. In the vicinity of the location at which the particle 301 collides with the superconducting nanostrip 202, a region 303 that transitions from superconduction to normal conduction is formed. Being in a normal conducting state, the region 303 has a resistance value, and an electric current 304 flows so as to bypass the region 303. A region 305 in which the electric current becomes dense due to this bypassing exceeds the superconducting critical current. For this reason, the region 305 transitions to normal conduction, the superconducting nanostrip 202 is divided, an electric resistance is generated, and the voltage temporarily rises. After that, the region 305 returns to a superconducting state by cooling. This voltage change causes generation of a pulse signal. The pulse signal is amplified by the amplifier 205. In a case where the height of the amplified pulse signal 401 is equal to or greater than a threshold 402, a rectangular wave 404 having a pulse width 403 of about 100 nanoseconds, for example, is output from the comparator 206.

The counter 207 includes a component that records a count value of each channel. When one rectangular wave 404 reaches the counter 207, the count value of the corresponding channel is incremented by one. In this manner, the count value of each of the N superconducting nanostrips is recorded in the counter 207.

Upon receiving a start command from the computer 160, the collection/distribution circuit 209 resets the count values of all the channels recorded in the counter 207 to zero. When a predetermined certain time has elapsed, the count values are read from the counter 207, the count values of all the channels are transferred to the computer 160, and the count values of all the channels are reset to zero. This operation is performed repeatedly.

Figure 5:
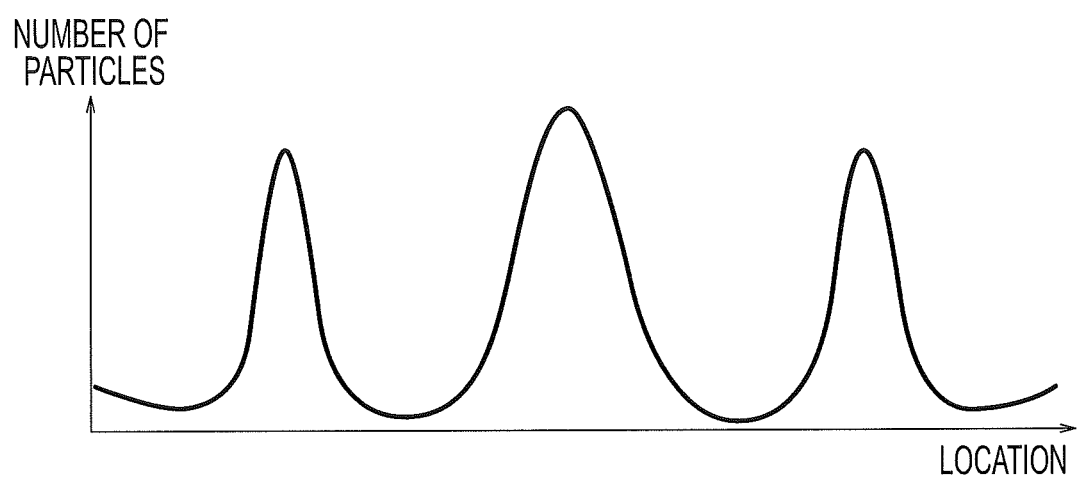
FIG. 5 is a waveform chart showing outputs of the particle detection device.

When a termination command is received from the computer 160, the operation is ended. The count values at the locations of the superconducting nanostrips corresponding to the respective channels are plotted, to obtain a one-dimensional location distribution of the number of particles that have reached the SSPD 110, as shown in FIG. 5.

As the one-dimensional location distribution is obtained while the SSPD 110 is moved with respect to the particle generation source 180, it is also possible to obtain a two-dimensional location distribution of the number of particles that have reached the SSPD 110. In a case where the particles are X-ray photons, this two-dimensional location distribution corresponds to an X-ray image.

Figure 4:
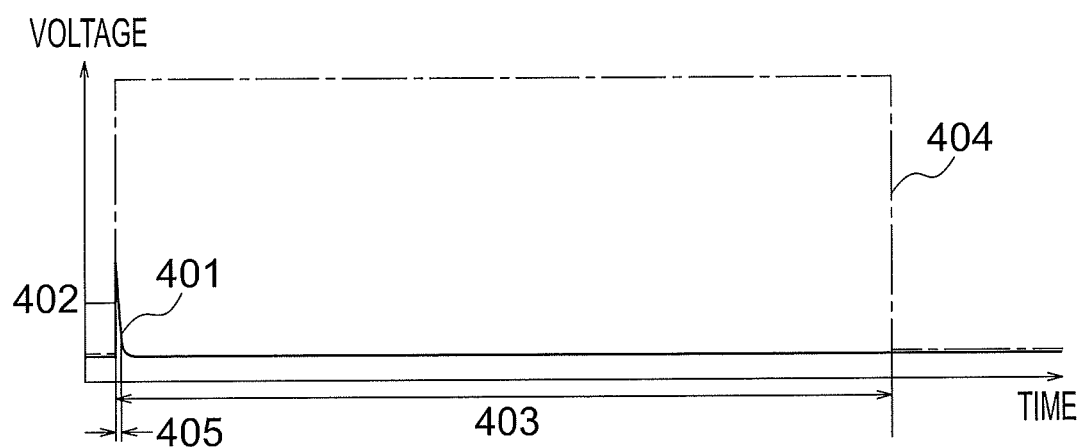
FIG. 4 is a waveform chart for explaining the operating principles of the particle detection device.

The pulse signal generated from the SSPD 110 is an analog signal of about two nanoseconds (corresponding to a frequency of 500 MHz) in a half width at half maximum 405 shown in FIG. 4, for example. Therefore, a high-speed transmission flexible printed circuit on which a large number of lines can be disposed with a small loss of high-frequency signals in a space-saving manner is used as cables 211 that connect the SSPD 110 and the conversion mechanism 130. Note that the high-speed transmission flexible printed circuit has a structure in which ground lines are disposed to surround signal lines like coaxial cables. Where the total cross-sectional area of the conductive portions (the signal lines and the ground lines) is represented by S, the length of the high-speed transmission flexible printed circuit is represented by L, and the heat conductivity of the material forming the conductive portions is represented by k, the amount W of heat propagating through the signal lines and the ground lines is expressed by Equation (1) shown below.

$$W = (k(T_2 - T_1)S)/L \tag{1}$$

As the amount of heat propagating through portions (insulating portions) other than the conductive portions in the cables 211 is substantially negligible, the material, the cross-sectional area S, and the length L of the conductive portions of the cables 211 are determined so that the heat amount W becomes sufficiently smaller (for example, 1/10 or less) than the cooling capacity of the first temperature maintaining portion 172 of the refrigerator 170. On the other hand, a signal to be used for communication between the aggregation mechanism 140 and the conversion mechanism 130 is a digital signal having a pulse width of about five microseconds (200 kHz). Normally, a signal energy loss is larger when the frequency of the signal is higher, the cross-sectional area of the conductive portion of each one signal line is smaller, and the distance is longer. Further, even if a digital signal has a certain degree of loss, the influence of the loss is smaller than that with an analog signal, because its value is "0" or "1". Therefore, a flexible printed circuit, a flat cable, a twisted pair cable, or the like having a smaller conductive portion cross-sectional area than that of a high-speed transmission flexible printed circuit is used a cable 212 that connects the conversion mechanism 130 and the aggregation mechanism 140. Thus, heat inflow is minimized.

Next, the effects of the first embodiment are described. The cooling capacity of the second temperature maintaining portion 174 of the refrigerator 170 is about several tens of W, and is much larger than the cooling capacity of the first temperature maintaining portion 172, which is 1 W or smaller. In this embodiment, the conversion mechanism 130 is connected to the second temperature maintaining portion 174, so that sufficient cooling can be performed even if the amount of heat generated by the conversion mechanism 130 is large. Further, the length of the cables 211 connecting the SSPD 110 and the conversion mechanism 130 is shorter than in a case where the conversion mechanism 130 is disposed outside the vacuum container 156, and loss is sufficiently reduced even if the cross-sectional area of each one signal line is small.

As the total cross-sectional area of the conductive portions is determined by the cooling capacity of the first temperature maintaining portion 172 as described above, the number of signal lines can be increased when the cross-sectional area of each one signal line is small. As a result, the SSPD 110 having a large number of superconducting nanostrips 202 can be installed.

Further, the aggregation mechanism 140 is disposed outside the second low-temperature container 154, so that the burden on the cooling capacity of the second temperature maintaining portion 174 can be reduced. As the aggregation mechanism 140 is housed in the vacuum container 156, cooling can be performed by the Peltier element 210 without condensation.

As described above, according to the first embodiment, the number of pulses of the SSPD 110 having a large number of superconducting nanostrips 202 can be counted with the conversion mechanism 130 and the aggregation mechanism 140 that are formed with semiconductor circuits having a large amount of heat generation, and a one-dimensional location distribution of the number of particles in a wider range can be obtained at once. That is, it is possible to provide a particle detection device that is capable of reducing heat inflow and can have a large number of superconducting nanostrips disposed therein.

A method by which a superconducting single-flux quantum circuit is used as a counter and is installed under a cryogenic environment to reduce heat inflow like a SSPD is also conceivable. However, unlike this embodiment, a superconducting single-flux quantum circuit has a problem that any large-scale device has not been formed with a superconducting single-flux quantum circuit.

Next, particle detection devices according to modifications of the first embodiment are described.

First Modification

Figure 6:
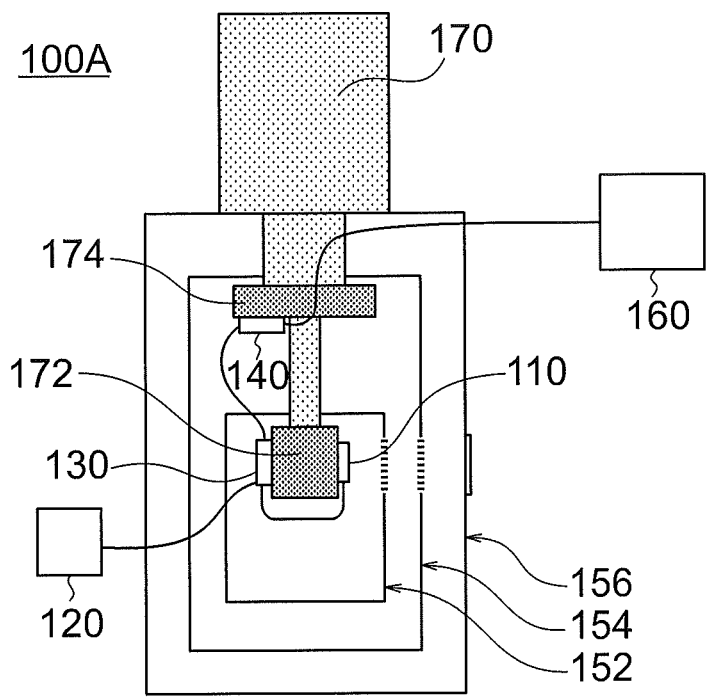
FIG. 6 is a cross-sectional diagram showing a particle detection device according to a first modification of the first embodiment.

FIG. 6 shows a particle detection device according to a first modification. A particle detection device 100A of the first modification differs from the particle detection device 100 of the first embodiment shown in FIG. 1, in that the conversion mechanism 130 is connected to the first temperature maintaining portion 172, and the aggregation mechanism 140 is connected to the second temperature maintaining portion 174.

Second Modification

Figure 7:
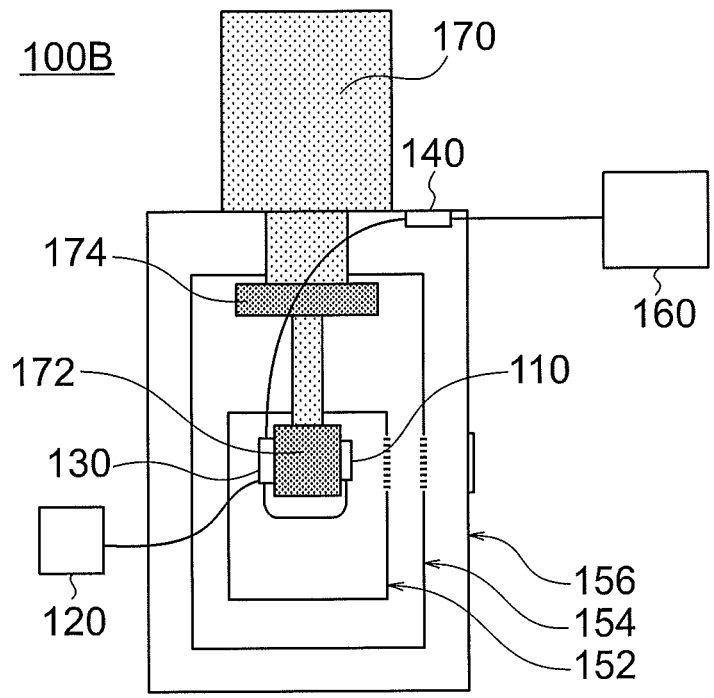
FIG. 7 is a cross-sectional diagram showing a particle detection device according to a second modification of the first embodiment.

FIG. 7 shows a particle detection device according to a second modification. A particle detection device 100B of the second modification differs from the particle detection device 100A of the first modification shown in FIG. 6, in that the aggregation mechanism 140 is disposed outside the second low-temperature container 154 and inside the vacuum container 156.

Third Modification

Figure 8:
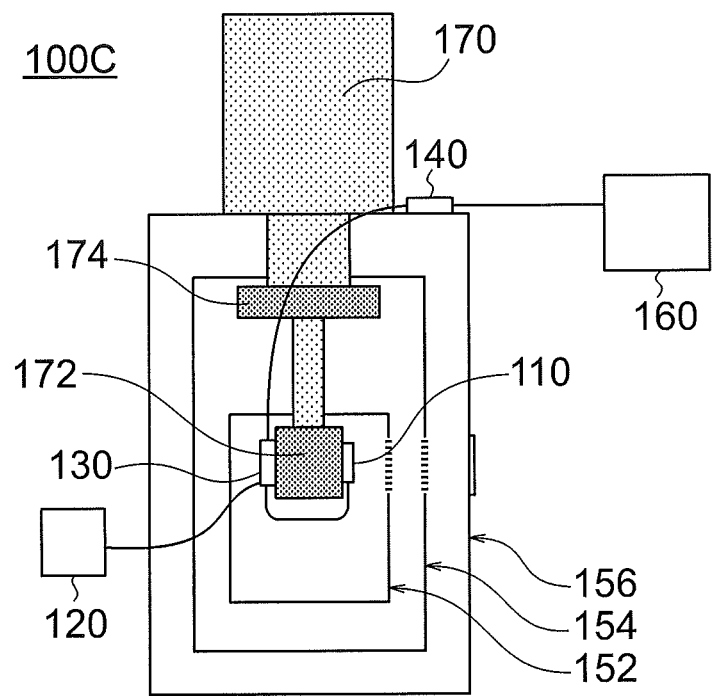
FIG. 8 is a cross-sectional diagram showing a particle detection device according to a third modification of the first embodiment.

FIG. 8 shows a particle detection device according to a third modification. A particle detection device 100C of the third modification differs from the particle detection device 100B of the second modification shown in FIG. 7, in that the aggregation mechanism 140 is disposed outside the vacuum container 156.

Fourth Modification

Figure 9:
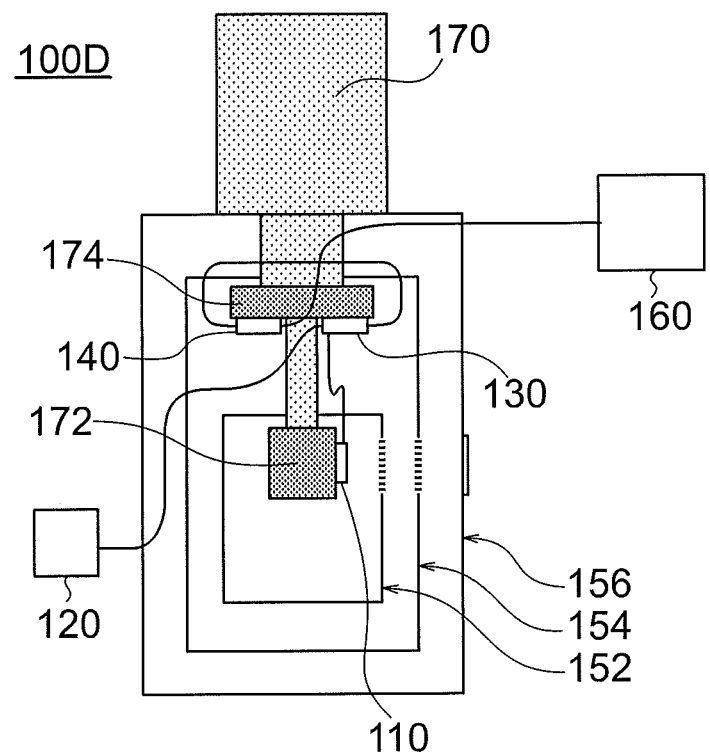
FIG. 9 is a cross-sectional diagram showing a particle detection device according to a fourth modification of the first embodiment.

FIG. 9 shows a particle detection device according to a fourth modification. A particle detection device 100D of the fourth modification differs from the particle detection device 100A of the first modification shown in FIG. 6, in that the conversion mechanism 130 is connected to the second temperature maintaining portion 174.

Fifth Modification

Figure 10:
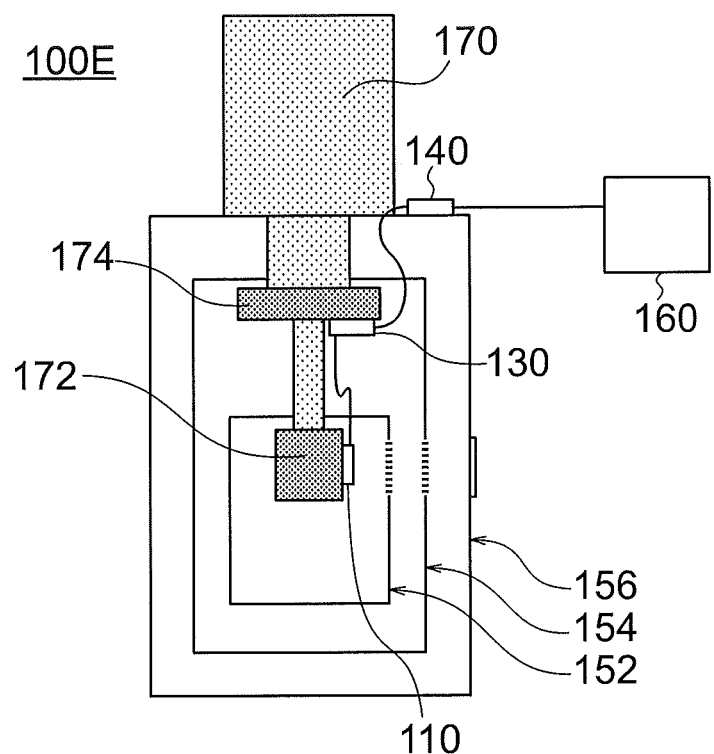
FIG. 10 is a cross-sectional diagram showing a particle detection device according to a fifth modification of the first embodiment.

FIG. 10 shows a particle detection device according to a fifth modification. A particle detection device 100E of the fifth modification differs from the particle detection device 100D of the fourth modification shown in FIG. 9, in that the aggregation mechanism 140 is disposed outside the vacuum container 156.

The first to fifth modifications have an effect to achieve an optimum layout with the operating temperature range and the amount of heat generation of the conversion mechanism 130 and the aggregation mechanism 140, and the cooling capacity of the first temperature maintaining portion 172 and the second temperature maintaining portion 174.

In a case where the aggregation mechanism 140 is disposed outside the vacuum container 156 as in the third modification and the fifth modification shown in FIG. 8 and FIG. 10, a cooling fan or cooling water is used in place of the Peltier element 210 for cooling the collection/distribution circuit 209. In this case, while the cooling temperature is higher, the state of the collection/distribution circuit 209 can be visually checked, and a setting change and the like can be easily made.

In a case where the conversion mechanism 130 is connected to the first temperature maintaining portion 172, and the aggregation mechanism 140 is installed outside the second low-temperature container 154 and inside the vacuum container 156 as in the second modification shown in FIG. 7, or in a case where the aggregation mechanism 140 is installed outside the vacuum container 156 as in the third modification, the second temperature maintaining portion 174 and the second low-temperature container 154 are not necessarily provided.

Sixth Modification

Figure 11:
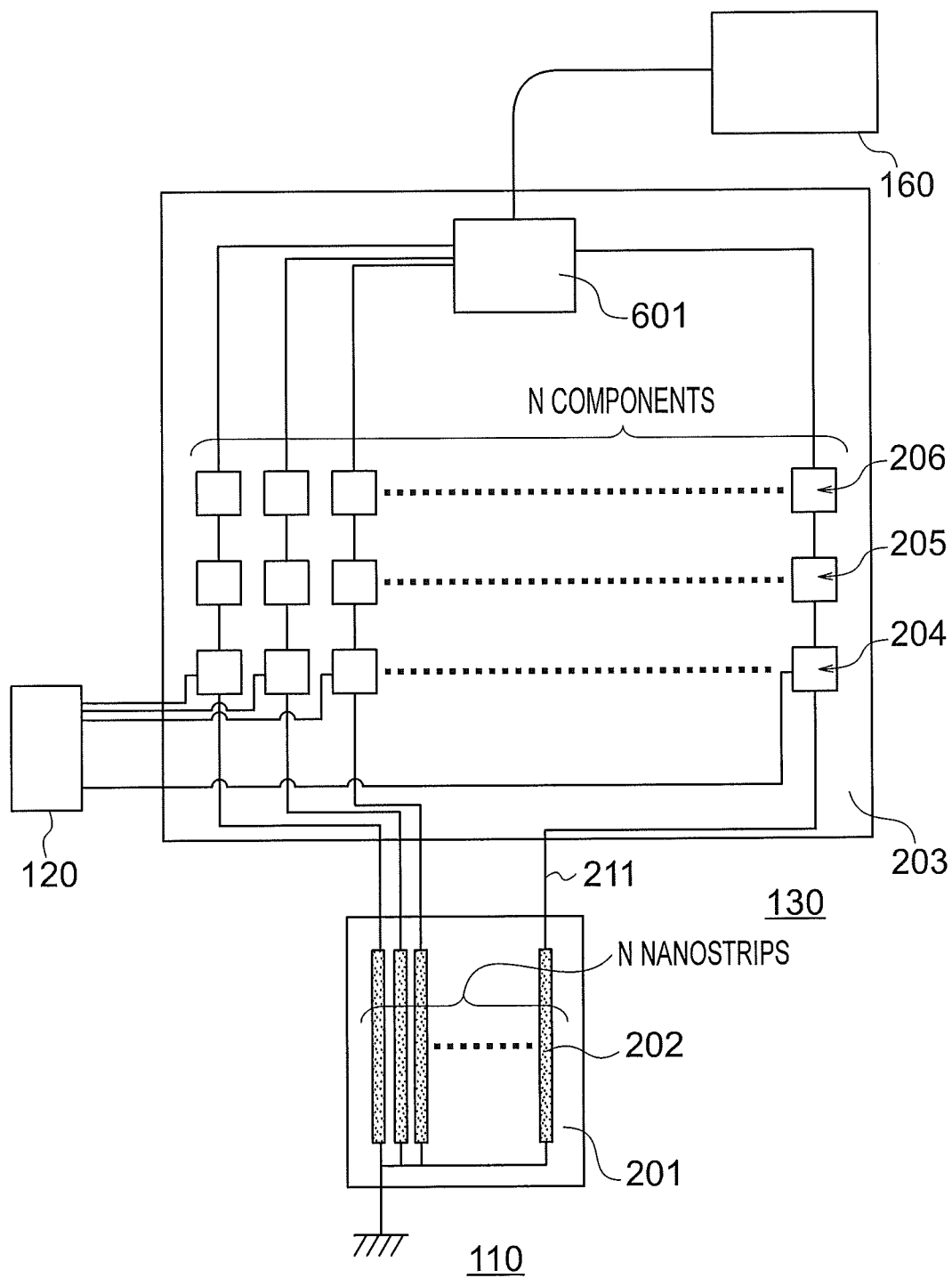
FIG. 11 is a circuit diagram showing a particle detection device according to a sixth modification of the first embodiment.

In a case where both the conversion mechanism 130 and the aggregation mechanism 140 are connected to the second temperature maintaining portion 174 as in the fourth modification shown in FIG. 9, the conversion mechanism 130 and the aggregation mechanism 140 can be formed on one substrate, and the counter and the collection/distribution circuit can be formed with one FPGA or ASIC 601 in a sixth modification shown in FIG. 11. In this case, a space-saving effect can be achieved.

Second Embodiment

Figure 12:
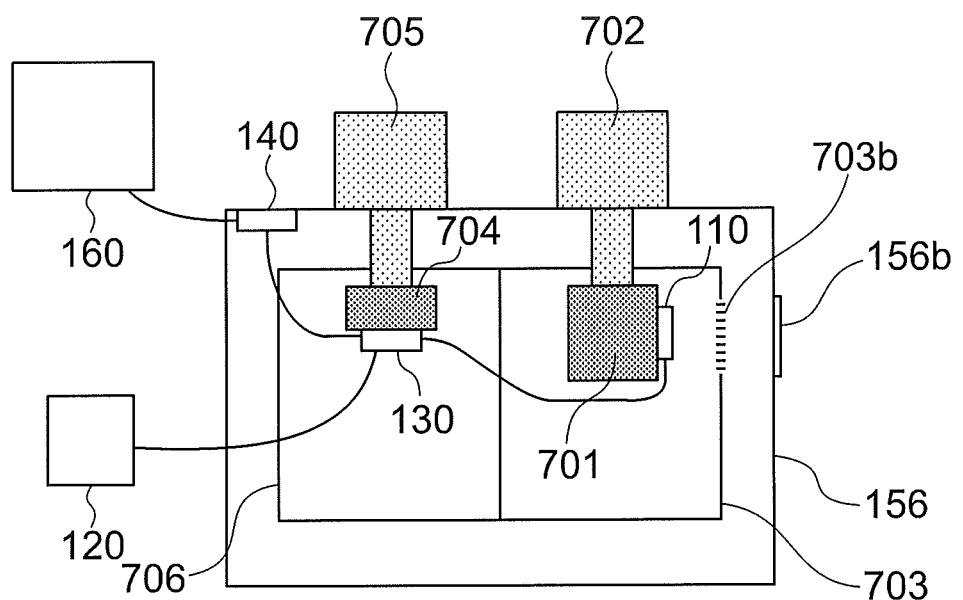
FIG. 12 is a cross-sectional diagram showing a particle detection device according to a second embodiment.

Referring now to FIG. 12, a particle detection device according to a second embodiment is described. A particle detection device 100F of the second embodiment uses a first refrigerator 702 and a second refrigerator 705, instead of the two-stage refrigerator 170 shown in FIG. 1. The first refrigerator 702 has a first temperature maintaining portion 701 that maintains temperature at $T_1$, and the first temperature maintaining portion 701 is housed in a first low-temperature container 703. The second refrigerator 705 has a second temperature maintaining portion 704 that maintains temperature at $T_2$. The second temperature maintaining portion 704 is housed in a second low-temperature container 706, and the first low-temperature container 703 and the low-temperature container 706 are arranged side by side in a vacuum container. In this case, the cooling capacity of the second temperature maintaining portion 704 can be enhanced, and the limitation on the amount of heat generation in the conversion mechanism 130 can be relaxed.

Third Embodiment

Figure 13:
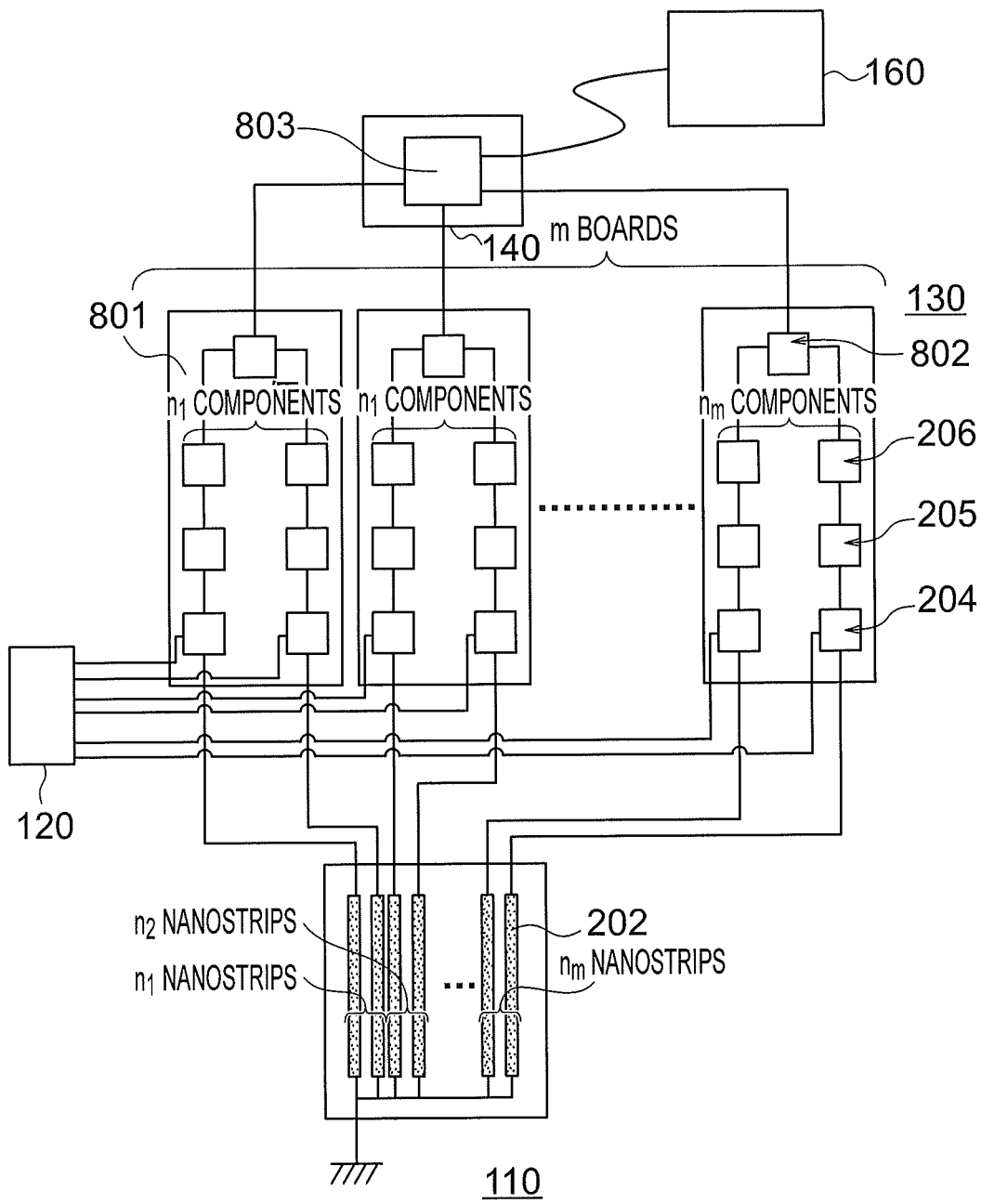
FIG. 13 is a circuit diagram showing a particle detection device according to a third embodiment.

Referring now to FIG. 13, a particle detection device according to a third embodiment is described. In the particle detection device 100 of the first embodiment shown in FIGS. 1 and 2, the conversion mechanism 130 has the N bias tees 204, the N amplifiers 205, the N comparators 206, and one counter 207 that are disposed on one board 203.

In the particle detection device of the third embodiment, on the other hand, the conversion mechanism 130 is divided into m boards. As shown in FIG. 13, on the m respective printed boards 801, $n_1$, $n_2$, . . . , and $n_m$ bias tees 204, amplifiers 205, and comparators 206, and one counter 802 having $n_1$, $n_2$, . . . , and $n_m$ channels are disposed. Here, $N=n_1+n_2+. . . +n_m$. One superconducting nanostrip 202 is connected to one bias tee 204, one amplifier 205, and one comparator 206, and is connected to one channel of a counter 802. Each of the m counters 802 is connected to a collection/distribution circuit 803 on the aggregation mechanism 140. The respective functions and other components are the same as those described in the first embodiment.

The particle detection device of the third embodiment can be used even in a case where the number N of the superconducting nanostrips 202 exceeds the number of the channels of the counters 802, and the same effects as those of the first embodiment can be achieved. It is possible to achieve an effect to further widen the range of the one-dimensional location distribution of the number of particles that can be acquired at once.

Fourth Embodiment

Figure 14:
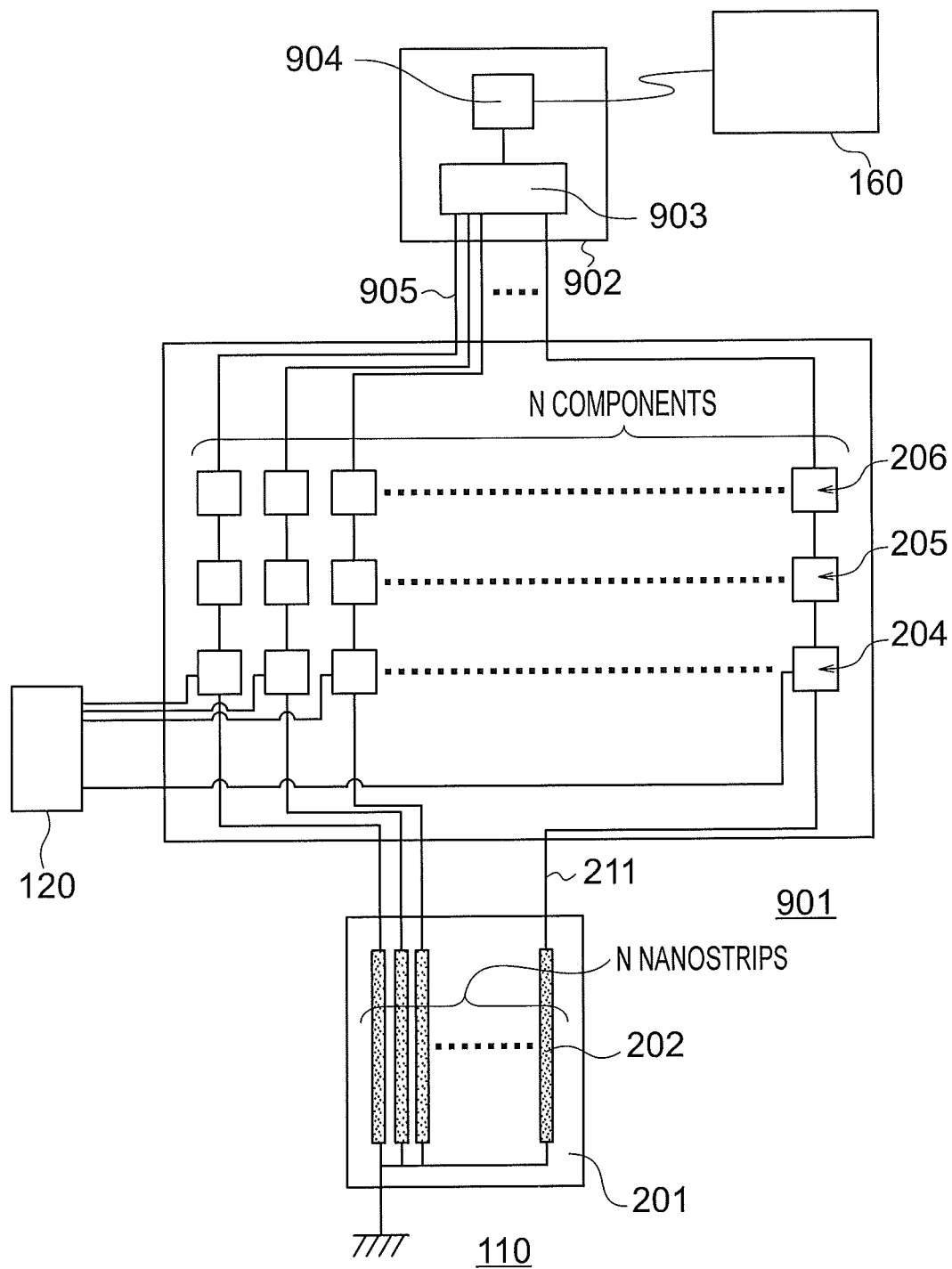
FIG. 14 is a circuit diagram showing a particle detection device according to a fourth embodiment.

Referring now to FIG. 14, a particle detection device according to a fourth embodiment is described. In the first embodiment shown in FIGS. 1 and 2, the conversion mechanism 130 includes the bias tees 204, the amplifiers 205, the comparators 206, and the counter 207.

In the fourth embodiment, a conversion mechanism 901 includes N bias tees 204, N amplifiers 205, and N comparators 206, as shown in FIG. 14. An aggregation mechanism 902 includes a counter 903 and a collection/distribution circuit 904.

In this embodiment, the counter 903 may be divided into m pieces, or the counter 903 and the collection/distribution circuit 904 may be formed with one FPGA or ASIC as in the sixth modification shown in FIG. 11.

A signal generated from a comparator 206 is a rectangular wave having a predetermined pulse width, and is binary data, or a digital signal, indicating whether a pulse signal has been generated from the SSPD 110. The predetermined pulse width of the rectangular wave is equal to or greater than 50 nanoseconds, preferably about 100 nanoseconds. Because information will not be lost even if there is some loss, cables having a small cross-sectional area can be used as cable 905 that connect the conversion mechanism 901 and the aggregation mechanism 902. Further, if each of the above amplifiers 205 can amplify a pulse signal to sufficiently compensate for a loss in the corresponding cable connecting the conversion mechanism 901 and the aggregation mechanism 902, the comparators 206 may not be provided, or the comparators 206 may be disposed in the aggregation mechanism, instead of the conversion mechanism. The other components are the same as those of the first embodiment.

According to the fourth embodiment, the same effects as those of the first embodiment can be achieved with a different mode from that of the first embodiment. In this case, it is possible to effectively use comparators, counters, and collection/distribution circuits that have operating temperature ranges around room temperature.

Fifth Embodiment

Figure 15:
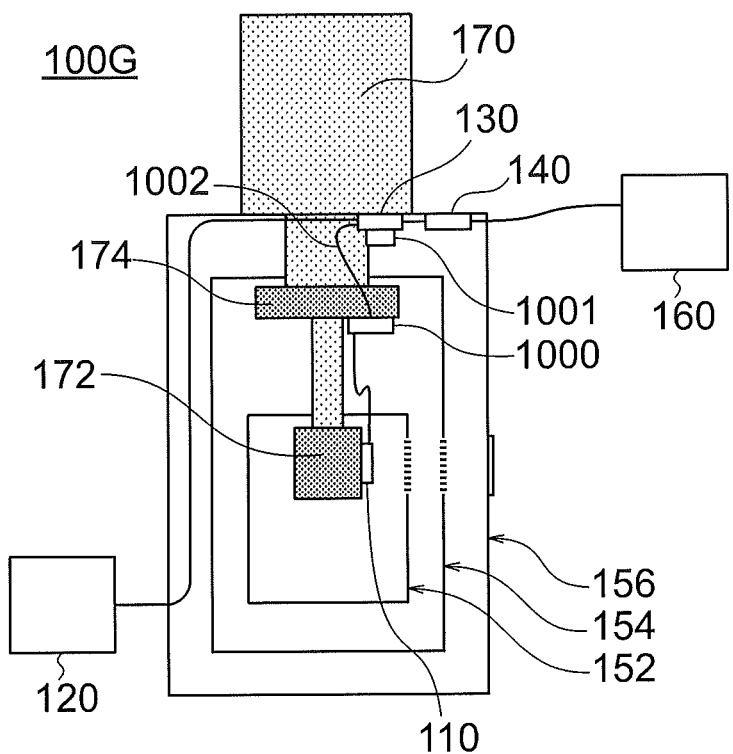
FIG. 15 is a cross-sectional diagram showing a particle detection device according to a fifth embodiment.

Referring now to FIG. 15, a particle detection device according to a fifth embodiment is described. In the first embodiment shown in FIG. 1, the conversion mechanism 130 is connected to the second temperature maintaining portion 174.

In a particle detection device 100G of the fifth embodiment, a connector 1000 is provided at the midpoint between the SSPD 110 and the conversion mechanism 130. The connector 1000 is connected to the second temperature maintaining portion 174, and the temperature of the connector is maintained at $T_2$. In this example, the connector 1000 may not be provided. However, to maintain the temperature of the cables (conductive portions) at the portions connected to the second temperature maintaining portion 174 at $T_2$, the surface on which the cables and the second temperature maintaining portion 174 are connected is made sufficiently large. The conversion mechanism 130 is disposed outside the second low-temperature container 154 and inside the vacuum container 156, and is cooled by a Peltier element 1001 (see FIG. 15).

Figure 16:
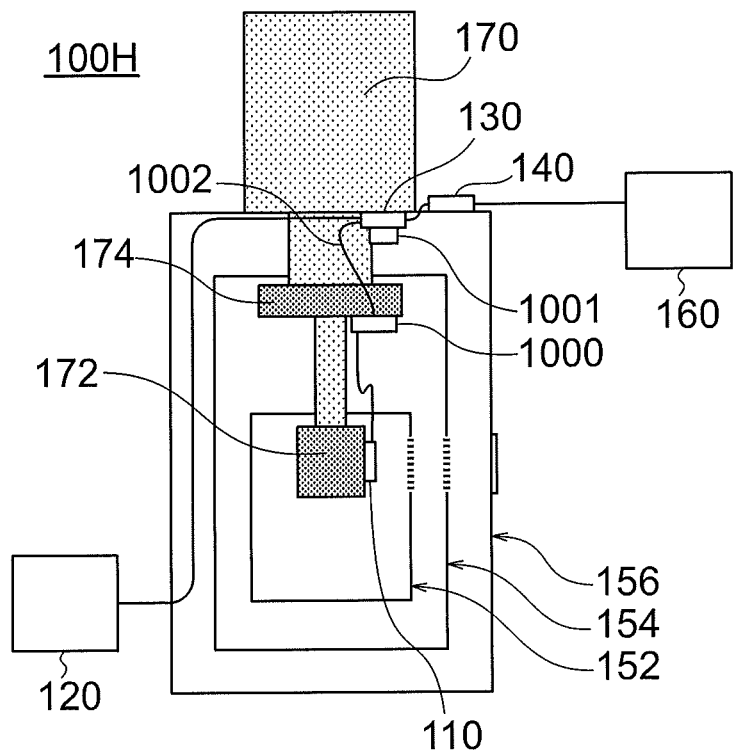
FIG. 16 is a cross-sectional diagram showing a particle detection device according to a modification of the fifth embodiment.
Figure 17:
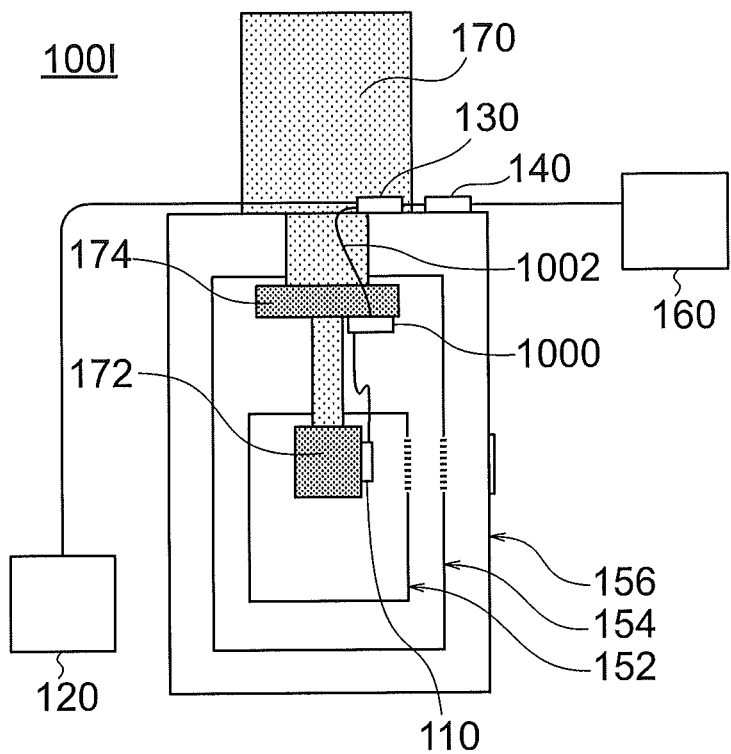
FIG. 17 is a cross-sectional diagram showing a particle detection device according to another modification of the fifth embodiment.

Note that, as in modifications of the fifth embodiment shown in FIGS. 16 and 17, the conversion mechanism 130 and the aggregation mechanism 140 may be disposed outside the vacuum container 156, and, in that case, are cooled by a cooling fan or cooling water. The amount of heat propagating through the cable connecting the SSPD 110 and the connector 1000 is represented by $W_s$, and the amount of heat propagating through the cable 1002 connecting the connector 1000 and the conversion mechanism 130 is represented by $W_c$. The length, the cross-sectional area, and the material of the conductive portion of the cable 1002, and the attachment position of the connector 1000 are determined so that $W_c$ becomes larger than $W_s$ but smaller than the cooling capacity of the second temperature maintaining portion 174. As the cooling capacity of the second temperature maintaining portion 174 is sufficiently large, the cross-sectional area of the conductive portion of the cable 1002 or the like can be made sufficiently larger, and the loss of the signal transmitted through the cable 1002 can be effectively reduced.

According to the fifth embodiment and its modifications, the conversion mechanism can be disposed outside the low-temperature container, and thus, an effect to ease the restrictions on the operating temperature of the conversion mechanism can be achieved.

Sixth Embodiment

Figure 18:
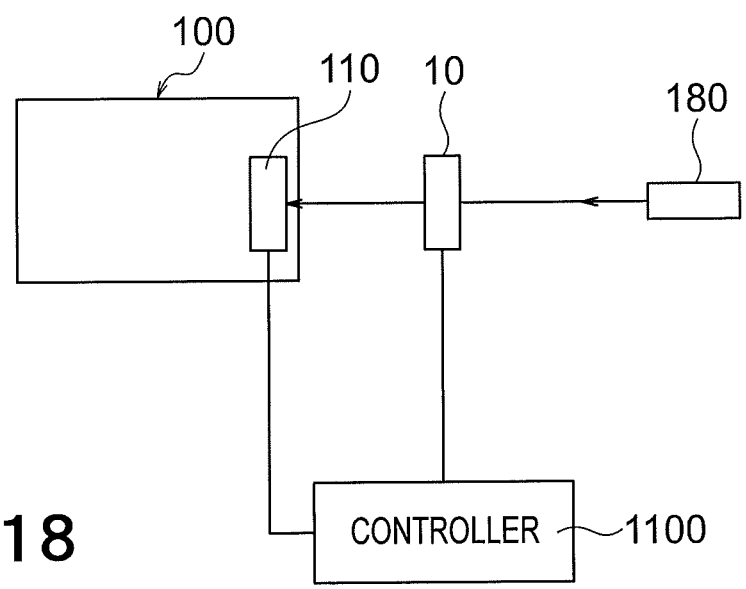
FIG. 18 is a block diagram showing an image generation apparatus according to a sixth embodiment.

Referring now to FIG. 18, an image generation apparatus according to a sixth embodiment is described. The image generation apparatus of the sixth embodiment includes a particle generation source 180 that generates an X-ray, for example, one of the particle detection devices of the first to fifth embodiments and the modifications thereof (the particle detection device 100 of the first embodiment, for example), and a controller 1100 that causes a sample 10 and the SSPD 110 of the particle detection device 100 to move relative to each other. The sample 10 is disposed between the particle generation source 180 and the SSPD 110, the sample 10 is irradiated with an X-ray generated from the particle generation source 180, and the X-ray that has passed through the sample 10 is detected by the SSPD 110. At this point of time, the sample 10 and the SSPD 110 are made to move relative to each other by the controller 1100, so that an X-ray image of the sample 10 can be obtained. For example, a two-dimensional image of the sample can be obtained, if the length and the width of the superconducting nanostrips are almost the same, and the relative movement is a movement in the extending direction of the superconducting nanostrips. In a case where the relative movement is a rotational movement about a centerline connecting the center of the SSPD 110 and the center of the particle generation source 180, a two-dimensional image of the sample 10 can be obtained. This image is generated by the computer 160. The image generation may be performed using a computer (not shown) disposed outside the particle detection device 100.

As the image generation apparatus of the sixth embodiment uses one of the particle detection devices of the first to fifth embodiments and the modifications thereof, it is possible to obtain an image generation apparatus that is capable of reducing heat inflow and can have a large number of superconducting nanostrips disposed therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A particle detection device comprising:
   a detector that includes a plurality of superconducting strips, and detects a particle generated from a particle generation source;
   a conversion mechanism that includes a plurality of channels provided for the respective superconducting strips, and converts an analog signal from a corresponding one of the superconducting strips into a digital signal;
   an aggregation mechanism that includes a circuit which receives an output from the conversion mechanism;
   a first temperature maintaining portion that maintains a first temperature that is equal to or lower than a superconducting transition temperature;
   a first low-temperature container that houses the first temperature maintaining portion; and
   a vacuum container that houses the conversion mechanism and the first low-temperature container, and has an opening,
   wherein the detector is housed in the first low-temperature container, and is connected to the first temperature maintaining portion,
   the conversion mechanism is maintained at a temperature equal to or higher than the first temperature, and
   the aggregation mechanism is disposed outside the first low-temperature container.

2. The particle detection device according to claim 1, further comprising:
   a second temperature maintaining portion that maintains a second temperature that is equal to or higher than the first temperature; and
   a second low-temperature container that houses the second temperature maintaining portion and the first low-temperature container, and is housed in the vacuum container.

3. The particle detection device according to claim 2, wherein the conversion mechanism is housed in the second low-temperature container, and is connected to the second temperature maintaining portion.

4. The particle detection device according to claim 1, wherein the conversion mechanism is housed in the first low-temperature container, and is connected to the first temperature maintaining portion.

5. The particle detection device according to claim 1, wherein the aggregation mechanism is housed in the vacuum container.

6. The particle detection device according to claim 2, wherein the aggregation mechanism is disposed in the second low-temperature container, and is connected to the second temperature maintaining portion.

7. The particle detection device according to claim 1, wherein the aggregation mechanism is disposed outside the vacuum container.

8. The particle detection device according to claim 1, further comprising:
   a second temperature maintaining portion that maintains a second temperature that is not lower than the first temperature; and
   a second low-temperature container that houses the second temperature maintaining portion, and is housed in parallel with the first low-temperature container in the vacuum container.

9. The particle detection device according to claim 1, wherein a cable is connected to the detector, and a value obtained by dividing a product of a cross-sectional area of a conductive portion of the cable, a temperature difference between both ends of the cable, and heat conductivity of the conductive portion by a length of the cable is equal to or less than 1/10 of cooling capacity in the first temperature maintaining portion.

10. The particle detection device according to claim 1, wherein the digital signal output from the conversion mechanism has a pulse width of 50 nanoseconds or greater.

11. The particle detection device according to claim 1, wherein
the plurality of superconducting strips is divided into a plurality of groups, and the conversion mechanism is divided in accordance with the groups, and is arranged in parallel, and
an analog signal generated from the superconducting strips belonging to each group is input to the conversion mechanism corresponding to the group.

12. The particle detection device according to claim 1, wherein a cable connecting the detector and the conversion mechanism is a flexible printed circuit.

13. The particle detection device according to claim 1, wherein the conversion mechanism includes: a bias tee that applies a direct current to a corresponding one of the superconducting strips and extracts an output signal of the superconducting strip; an amplifier that amplifies an output of the bias tee; a comparator that determines whether an output of the amplifier is equale to or higher than a threshold, and outputs a digital signal when the output of the amplifier is not lower than the threshold; and a counter that counts outputs from the comparator, a plurality of the bias tees, a plurality of the amplifiers, a plurality of the comparators being provided for the plurality of superconducting trips.

14. An image generation apparatus comprising: the particle detection device according to claim 1; the particle generation source; a controller that causes the detector of the particle detection device and a sample to move relative to each other;
and an image generation portion that generates an image of the sample, on a basis of an output of the aggregation mechanism.

15. A particle detection device comprising:
a detector that includes a plurality of superconducting strips, and detects a particle generated from a particle generation source;
a conversion mechanism that includes a plurality of channels provided for the respective superconducting strips, and converts an analog signal from a corresponding one of the superconducting strips into a digital signal;
an aggregation mechanism that includes a circuit which receives an output from the conversion mechanism;
a cable that connects the detector and the conversion mechanism;
a first temperature maintaining portion that maintains a first temperature that is equal to or lower than a superconducting transition temperature;
a first low-temperature container that houses the first temperature maintaining portion;
a second temperature maintaining portion that maintains a second temperature that is equal to or higher than the first temperature; and
a vacuum container that houses the first low-temperature container and the second temperature maintaining portion, and has an opening,
wherein the detector is housed in the first low-temperature container, and is connected to the first temperature maintaining portion,
the cable is connected to the second temperature maintaining portion, and the cable at a portion connected to the second temperature maintaining portion is maintained at the second temperature, and
the aggregation mechanism is disposed outside the first low-temperature container.

16. The particle detection device according to claim 15, further comprising a connector at a midpoint of the cable connecting the detector and the conversion mechanism, wherein the connector is connected to the second temperature maintaining portion, and is maintained at the second temperature, and an amount of heat propagating through a cable connecting the detector and the connector is smaller than an amount of heat propagating through a cable connecting the connector and the conversion mechanism.

* * * * *

UNITED STATES PATENT AND TRADEMARK OFFICE
CERTIFICATE OF CORRECTION

| | |
|---|---|
| PATENT NO. | : 11,513,238 B2 |
| APPLICATION NO. | : 17/447788 |
| DATED | : November 29, 2022 |
| INVENTOR(S) | : Takeshi Yamane |

It is certified that error appears in the above-identified patent and that said Letters Patent is hereby corrected as shown below:

In the Claims

Claim 13, Column 11, Line 25, "is equale to" should read --is equal to--.

Signed and Sealed this
Thirteenth Day of June, 2023

Katherine Kelly Vidal
*Director of the United States Patent and Trademark Office*